June 26, 1962     A. HOFFMANN     3,040,564
SAFETY TEST STAND FOR ROTORS
Filed Nov. 26, 1958     3 Sheets-Sheet 1
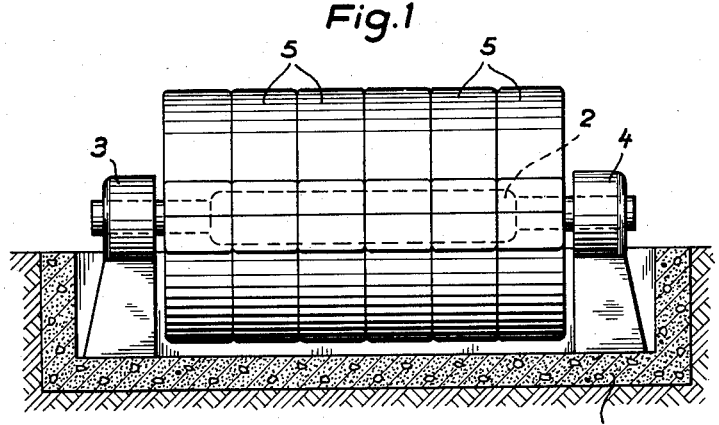
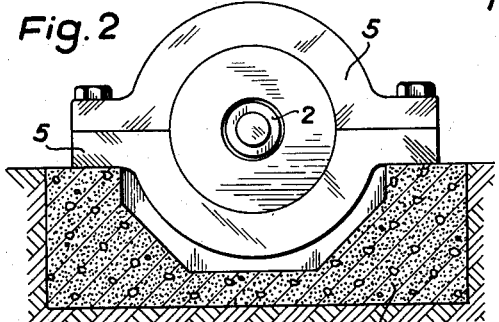
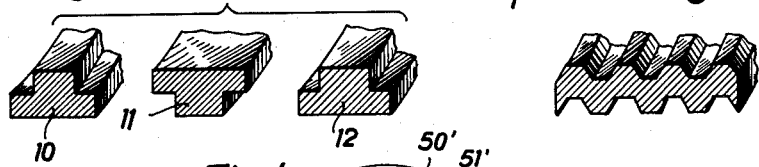
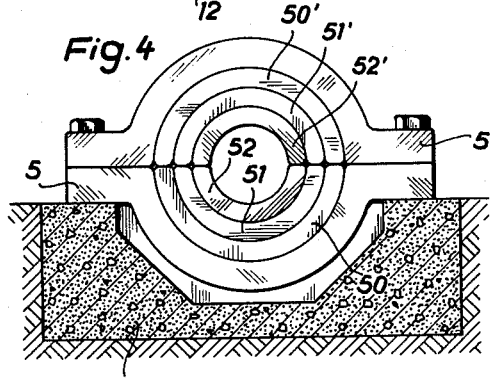
Inventor.
August Hoffmann.

June 26, 1962  A. HOFFMANN  3,040,564
SAFETY TEST STAND FOR ROTORS
Filed Nov. 26, 1958  3 Sheets-Sheet 3
Fig.8 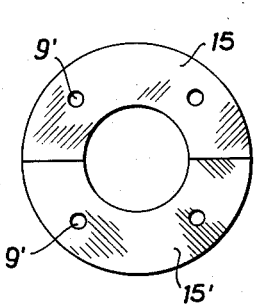 Fig.8a  Fig.9 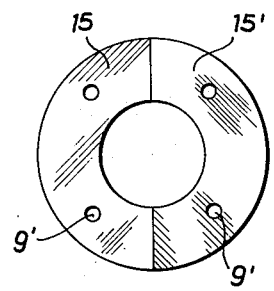
Fig.10
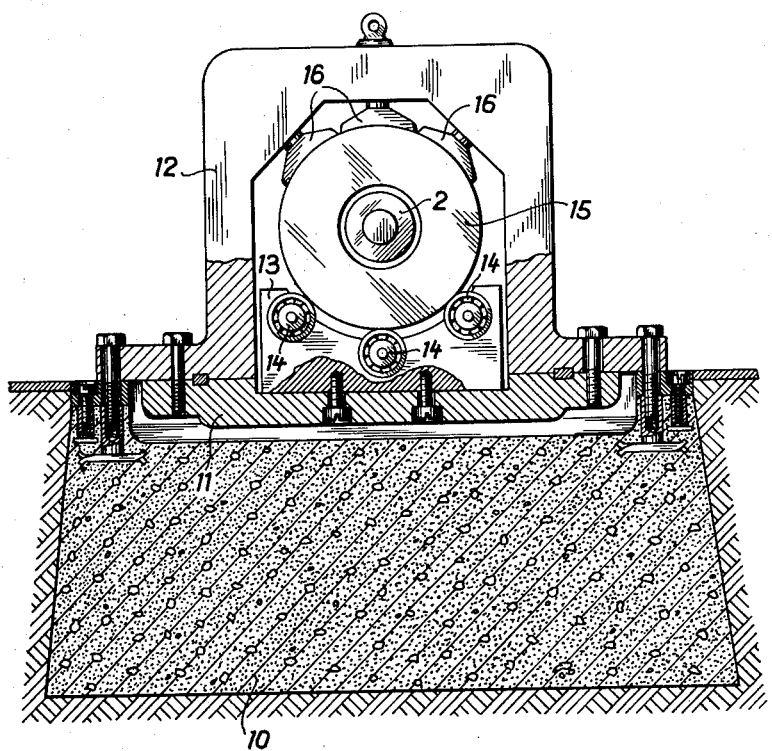

United States Patent Office 3,040,564
Patented June 26, 1962

3,040,564
SAFETY TEST STAND FOR ROTORS
August Hoffmann, Sigismundkorso 75, Berlin-Frohnau, Germany
Filed Nov. 26, 1958, Ser. No. 776,641
Claims priority, application Germany Dec. 4, 1957
13 Claims. (Cl. 73—88)

This invention is concerned with a safety test stand for rotors of various machines including generators, gas turbine rotors, centrifugal compressors and the like.

The rotors of large electric machines, such as the inductors of large generators, are customarily subjected to a centrifugal test during which they are driven at a speed of rotation exceeding the normal operating speed. Inductors of vertical generators are for this purpose placed in a cylindrical centrifugal test pit extending along a vertical axis, the walls of such pit being sufficiently armed. In the event that an explosion should occur in the centrifuging of such an inductor, the parts that are torn off, which lie rather deeply in the pit, fly horizontally against the pit wall which may in this manner be more or less severely damaged. The surroundings of the pit are generally unaffected by the effects of such an explosion.

The situation is different in the case of rotors of machines disposed along a horizontal axis, particularly in the case of inductors of turbo generators. These rotors are for the centrifugal test likewise placed into a centrifugal test pit extending deeply into the ground, with the shaft thereof journalled to extend in horizontal direction. The test pit is after placement of the inductor thereinto covered by a heavy armor plate or by a plate of concrete reinforced with iron, such armored plae being usually supported upon rollers running on rails for placement on top of the test pit.

It was found that this kind of covering of the test pit does not provide sufficient protection against damage in the vicinity of the pit, which is particularly true in the most unfavorable case, namely, if the inductor should tear apart along a plane extending along the axis thereof. Two parts each with about one-half of the weight of the inductor are in such a case present and the part which is at the instant of the explosion on top flies against the cover plate and tears therethrough. Smaller explosion parts may, however, likewise tear through the cover plate and cause damage in the vicinity of the test pit.

These observations do not only apply to inductors of high-speed generators, but also to other machines operating at high speed of rotation, for example, gas turbine rotors, centrifugal compressors and the like. For the sake of convenience, the following explanations will refer to inductors, but it is understood that this term is intended to include other parts or elements to be subjected to centrifugal testing.

The invention avoids the described drawbacks by the provision of a safety test stand for the centrifugal testing of elements of the type noted above, comprising walls which are adjustable so that they may be matched to the shape and size of the body to be tested, leaving only a relatively small air gap between the walls and the body to be tested.

The invention proceeds from the recognition of the fact that the damaging effect in prior structures which usually provide a relatively large space between the body to be tested and the pit wall or cover plate, is mainly due to the high initial velocity imparted to a part torn off and flying primarily in radial direction, which cannot be absorbed by the wall or by the cover plate without damage thereto. The basic thought therefore is, that radially directed forces and the energy corresponding thereto, shall be prevented from taking effect.

The invention provides for this purpose arcuate structural wall parts which are in required number side by side or concentrically interjoined, resulting in a firm wall surrounding the body to be tested with a very small air gap amounting only to about 1 or 2 centimeters. After passing across this small gap, a torn off part, for example, of an inductor, hits and rolls along the inner wall of the test stand resulting in very strong frictional forces which effect quick braking of the energy imparted thereto. The rolling motion of the inductor along the inner wall of the test stand is executed in a direction opposite to the normal direction of rotation thereof.

The foregoing and further objects and features of the invention will appear from the description which will be rendered below with reference to the accompanying drawings showing in schematic manner embodiments thereof. In the drawings, FIG. 1 shows a test stand according to the invention as seen from the side, with some parts indicated in section;

FIG. 2 is an end view of the test stand;

FIGS. 3, 4 and 5 illustrate details of structural parts of which the test stand is constructed so that the interior thereof can be matched to the dimensions of an inductor in radial and longitudinal direction thereof;

FIGS. 8, 9 and 10 indicate embodiments in which the body to be tested is surrounded by a structure comprising arcuate segment-like plates extending axially thereof and being provided with mutually angularly displaced joints.

Figure 6:
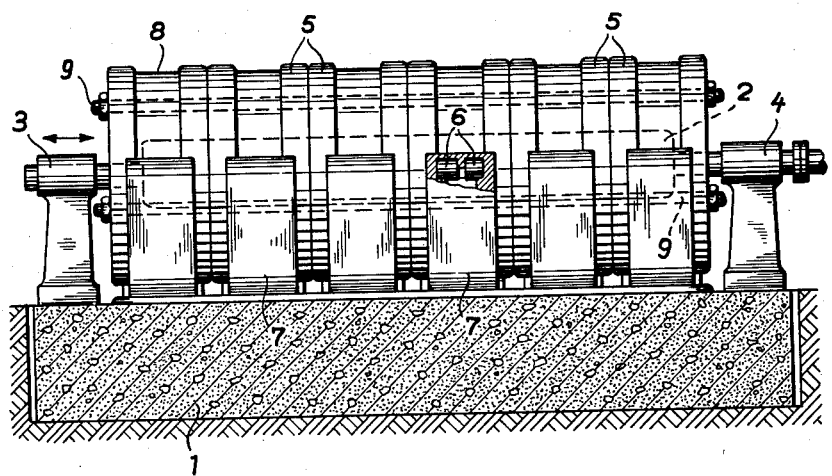
FIGS. 6 and 7 show an embodiment in which the body to be tested is surrounded by a subdivided cylindrical structure.

In FIGS. 1 and 2, numeral 1 indicates the foundation or test pit and 2 indicates the inductor which is in this case disposed above the ground. The inductor is journalled at 3 and 4 and is suitably driven by a motor (not shown). The inductor is surrounded by a test casing comprising structural parts 5 disposed side by side, the number of such parts corresponding to the length of the inductor. The test casing can accordingly be easily adapted to given lengths of inductors to be tested.

FIG. 3 shows examples of the shapes of the structural parts of the test casing. The parts 10, 11, 12 are cross-sectionally generally T-shaped. When these parts are joined in dovetail fashion, they will produce a firm casing with each part tooth-like interlocked with parts adjacent thereto. The cross-sectional form of these parts is purposely such that large frictional surfaces will be provided between neighboring parts. An exploded inductor, upon impacting the inner wall of the test casing will produce forces tending to take along and move in the direction of rotation thereof some of the structural parts of which the casing is constructed. The parts provide for this reason large inwardly facing friction surfaces so as to quickly dissipate the kinetic energy of the inductor or fractions thereof.

FIG. 4 shows the cross-sectional shape of the foundation 1 and of structural parts 50, 51, 52 and 50', 51', 52', respectively. These structural parts are concentrically disposed within the outer casing ring 5 and the dimensions thereof are such that the inner diameter of the test casing can be approximately or matched to the outer diameter of the body to be tested, leaving only a small air gap therebetween. These structural parts are in the simplest form semicircular, that is, they have only one partial joint extending along a horizontal plane. The edges of the individual structural parts are as shown in the drawing somewhat offset so as to assure that no protruding edge remains in the assembly on which a wedge or key emerging from its groove can be caught. The structural parts, for weight reduction reasons, may however be formed in the manner of circular members each comprising a plurality, for example, three portions.

FIG. 5 shows another advantageous cross-sectional shape for the structural parts, exhibiting essentially trapezoidal form so as to provide large frictional surfaces between neighboring or concentrically interjoined parts.

The individual structural parts are in the interest of safety and reliability made of material having a specific weight as high as possible. Highly heat resistant materials are primarily to be considered in view of the appreciable frictional heat produced by engagement with the inductor. The structural parts may therefore be made of special steel or, if desired, of armed or reinforced concrete. It may under some circumstances be desirable to provide at least the innermost structural parts with brake linings or coatings made, for example, of metals produced by powder-metallurgical processes.

In the described embodiment, radially directed forces of only small magnitude will occur due to the short path extending between the body undergoing testing and the inner wall of the test casing. A great part of the energy of the rapidly rotating test body is in case of explosion destroyed by combined rolling and sliding motion of the test body along the casing wall, whereby individual parts of the test casing may also execute motions relative to other parts. The plurally provided concentrically arranged structural parts are in the case of a rotor explosion subjected to primarily tangentially effective forces and may rotate or at least attempt to rotate responsive thereto. The energy is destroyed or dissipated not only upon one but upon a plurality of concentrically disposed cylindrical joints.

The casing for the inductor, instead of comprising a given plurality of semicircular structural parts, many be formed by a unitary hollow cylindrical structure. Partial joints extending in radial direction are thereby absent. A plurality of hollow cylindrical parts are in such case again interjoined so as to provide an inner bore with a diameter reduced such that it is spaced from the test body by a small air gap amounting to about 1 to 2 centimeters.

Referring now to FIG. 6, numeral 1 indicates the foundation and 2 indicates an inductor disposed in the safety test structure. The inductor is journalled in properly lubricated bearings 3, 4 and is driven by a suitable motor (not shown) so as to execute the balancing operations and the centrifugal testing. The inductor is surrounded by structural parts 5 disposed side by side in a number sufficient to enclose the inductor throughout its length. The subdivision of the casing into individual structural parts, each of which is relatively heavy, facilitates assembly.

Figure 7:
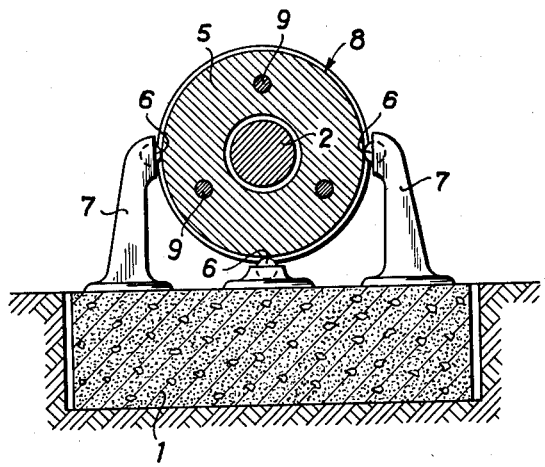

The sectional view FIG. 7 shows that the structural parts 5 form a hollow cylinder without partial joints extending in radial direction. The matching to the outer diameter of the test body is effected by concentric interjoining of several of such hollow cylinders. The inductor to be tested is inserted into the correspondingly prepared test device as it would be inserted in the stator of a machine.

As shown in FIG. 7, the test casing 5 is journalled on rollers 6, thus providing for the possibility of imparting to the casing rotation responsive to tangential forces exerted thereon when the test body touches the inner wall thereof during the testing.

The test body may be provided with a coating of heat resistant material so as to protect it during the centrifugal test; the frictional forces occurring in such a case only between the coating and the inner wall of the test casing, the surface of the test body being protected against damage. This coating of heat resistant material must of course be removed during the balancing operation since the inductor as such is to be tested.

The unitary casing bodies 5 are made of material of great mechanical strength. In accordance with the foregoing explanations, the device is intentionally constructed so that the entire test casing can rotate about its own axis and about the axis of the inductor or test body. In order to avoid excessively great frictional forces which depend upon the relative speed obtained between the test body and the test casing at the instant of contacting, it may be advantageous to drive the test casing at a suitable speed of rotation. It may be in some circumstances advantageous to apply about one-half of the centrifugal r.p.m. of the test body so as to avoid undue stresses on the test casing 5 resulting from centrifugal forces imparted thereto.

It is at any rate recommended to provide means for gripping the test casing from all sides. Accordingly, securing rollers may be provided in the lower part of the test casing, as shown in FIG. 7, and also rollers engaging the test casing on top, and such rollers may be journalled in frame means anchored to the foundation.

The test casing may be provied with a lining to be inserted last and consisting of a heat resistant material. The lining may be in the form of a cold-shrunk cylinder which is inserted into the test casing before assembling the inductor therewith. This lining may be provided with a friction coating on the inside thereof.

The test casing, as shown in FIG. 7, is held in position by rollers, for example, three rollers disposed respectively or pairs of rollers at the lowermost point and laterally along a horizontal plane extending through the central axis. The lateral rollers 6 are journalled in bearing stands 7. The individual structural parts 5 are centrally radially recessed as indicated at 8, thus providing running tracks of smaller diameter for the rollers 6, thereby also securing the parts against undesired axial displacement. All structural parts 5 are fastened together by means of tightening rods 9.

Increased mechanical stability is secured by a somewhat modified arrangement of the individual structural elements or parts as shown schematically in FIGS. 8, 8a and 9, employing for the test casing segment-like plates such as 15 and 15′ which are in axial direction relatively narrow with the partial joints thereof disposed in mutually angularly displaced relationship. More in detail, an element comprising the plates 15, 15′ (FIGS. 8 and 8a) may be disposed with the joints extending horizontally and the next adjacent element comprising similar plates 15, 15′ (FIG. 9) may be disposed with the joints thereof extending vertically. The alternate angular displacement of the elements is effected throughout the structure. The corresponding parts are held together by tensioning bolts extending axially in parallel through holes such as 9, 9′ provided in the various elements. The angular displacement of the joints results in interlinking connections between the individual structural parts, thereby providing for increased security against destruction. The parts 15 and 15′ (FIGS. 8, 9) may be made of processed metal sheet, about 50 to 80 millimeters thick and may be assembled axially side by side to form the test casing.

FIG. 10 shows in its upper part an elevational end view and in its lower part a cross-sectional view of the safety test stand. Upon a massive foundation 10 is disposed a yoke 12 carrying a bottom portion 11, forming a frame for receiving the test casing 15. Upon the bottom portion 11 are disposed bearing members 13 carrying roller bearings 14 for supporting the test casing 15 in which is inserted the test body, for example, the inductor of a turbo generator. Upon appearance of an eccentricity, the inductor will touch the inside wall of the bore of the test casing 15, producing strong frictional forces which quickly dissipate the kinetic energy. The journalling of the test casing upon roller bearings will allow the casing to rotate responsive to such forces, the rotation consuming part of such forces and contributing to the dissipation thereof. The test casing may be provided with schematically indicated brake means 16 disposed advantageously diametrically in pairs so as to relieve the entire casing 15 and especially its journals of the brake pressure. The diametrically effective brake pressure is cancelled and does not produce any deformation of the test casing. The brakes 16 may be actuated by suitable means (not shown), at a desired instant, for example, responsive to rotation of the test casing or start of rotation thereof.

The term "rotary bodies" in the claims is intended to embrace relatively heavy rotors including, for example, rotors of the class of machines including electric generators, centrifugal compressors, gas turbines and the like, in short, rotors of any desired machine of the indicated type that may be subjected to centrifugal testing including balancing by the use of the safety test stand disclosed herein.

Changes may be made within the scope and spirit of the appended claims.

I claim:

1. A test stand for subjecting to centrifugal testing relatively heavy rotors of the class of machines including electric generators, gas turbines, centrifugal compressors and the like, including a protective casing for receiving a rotor to be subjected to centrifugal testing, means for mounting said rotor for rotation within said casing, said casing comprising a plurality of structural parts adapted to be assembled so as to form a tubular structure having the inner wall thereof conforming substantially to the shape and size of the rotor to be tested and extending relatively closely spaced from the rotor surrounded thereby, said structural parts being generally circular and assembled side by side, each part comprising a plurality of members concentrically assembled and joined axially and radially to provide large frictional surfaces therebetween, the number of said structural parts being determined by the length of the rotor to be tested and the number of the structural members in each structural part being determined by the diameter of the rotor to be tested.

2. A structure according to claim 1, wherein said elements are cross-sectionally substantially T-shaped elements.

3. A structure according to claim 1, wherein said elements are cross-sectionally substantially of trapezoidal shape.

4. A test stand for subjecting to centrifugal testing relatively heavy rotors of the class of machines including electric generators, gas turbines, centrifugal compressors and the like, including a protective casing for receiving a rotor to be subjected to centrifugal testing, means for mounting said rotor for rotation within said casing, said casing comprising a plurality of hollow rotatably mounted circumferentially unitary cylindrical structural parts adapted to be assembled in side by side relation to form a tubular structure having the inner wall thereof conforming substantially to the shape and size of the rotor to be tested and extending relatively closely spaced from the rotor surrounded thereby.

5. A test stand for subjecting to centrifugal testing relatively heavy rotors of the class of machines including electric generators, gas turbines, centrifugal compressors and the like, including a protective casing for receiving a rotor to be subjected to centrifugal testing, means for mounting said rotor for rotation within said casing, said casing comprising a plurality of hollow circumferentially unitary cylindrical structural parts adapted to be assembled in side by side relation to form a tubular structure having the inner wall thereof conforming substantially to the shape and size of the rotor to be tested and extending relatively closely spaced from the rotor surrounded thereby, and journal means for mounting said structural parts for rotation about the common axis thereof.

6. A test stand for subjecting to centrifugal testing relatively heavy rotors of the class of machines including electric generators, gas turbines, centrifugal compressors and the like, including a protective casing for receiving a rotor to be subjected to centrifugal testing, means for mounting said rotor for rotation within said casing, said casing comprising a plurality of structural parts adapted to be assembled so as to form a tubular structure having the inner wall thereof conforming substantially to the shape and size of the rotor to be tested and extending relatively closely spaced from the rotor surrounded thereby, and lining means carried by said inner wall providing an inner diameter thereof which is only relatively slightly greater than the outer diameter of the rotor to be tested.

7. A structure according to claim 6, comprising a coating of heat resistant material carried by said lining means.

8. A structure according to claim 7, wherein said coating is in the form of a cold-shrunk cylindrical member.

9. A test stand for subjecting to centrifugal testing relatively heavy rotors of the class of machines including electric generators, gas turbines, centrifugal compressors and the like, including a protective casing for receiving a rotor to be subjected to centrifugal testing, means for mounting said rotor for rotation within said casing, said casing comprising a plurality of structural parts adapted to be assembled so as to form a tubular structure having the inner wall thereof conforming substantially to the shape and size of the rotor to be tested and extending relatively closely spaced from the rotor surrounded thereby, and means for rotating said casing in a direction corresponding to the direction of rotation of the body to be tested.

10. A test stand for subjecting to centrifugal testing relatively heavy rotors of the class of machines including electric generators, gas turbines, centrifugal compressors and the like, including a protective casing for receiving a rotor to be subjected to centrifugal testing, means for mounting said rotor for rotation within said casing, said casing comprising a plurality of relatively narrow circular members each composed of semicircular parts abutting along a radial plane, and means for assembling said members side by side with the radial abutting joints of alternate members angularly displaced relative to neighboring members so as to form a tubular structure having the inner wall thereof conforming substantially to the shape and size of the rotor to be tested and extending relatively closely spaced from the rotor surrounded thereby.

11. A structure according to claim 10, comprising yoke means for supporting said test casing.

12. A structure according to claim 10, comprising roller bearings for rotatably supporting said test casing.

13. A structure according to claim 12, comprising brake means for said test casing.

References Cited in the file of this patent

UNITED STATES PATENTS

| | | |
|---|---|---|
| 1,805,896 | Weinland | May 19, 1931 |
| 2,405,060 | Scofield | July 30, 1946 |
| 2,738,647 | Hill | Mar. 20, 1956 |
| 2,814,944 | Brown | Dec. 3, 1957 |
| 2,879,936 | Faught | Mar. 31, 1959 |
| 2,987,296 | Ferguson | June 6, 1961 |